March 26, 1968  A. V. ALEXEFF  3,375,150
TIRE MANUFACTURING METHODS
Original Filed May 27, 1965  2 Sheets-Sheet 1
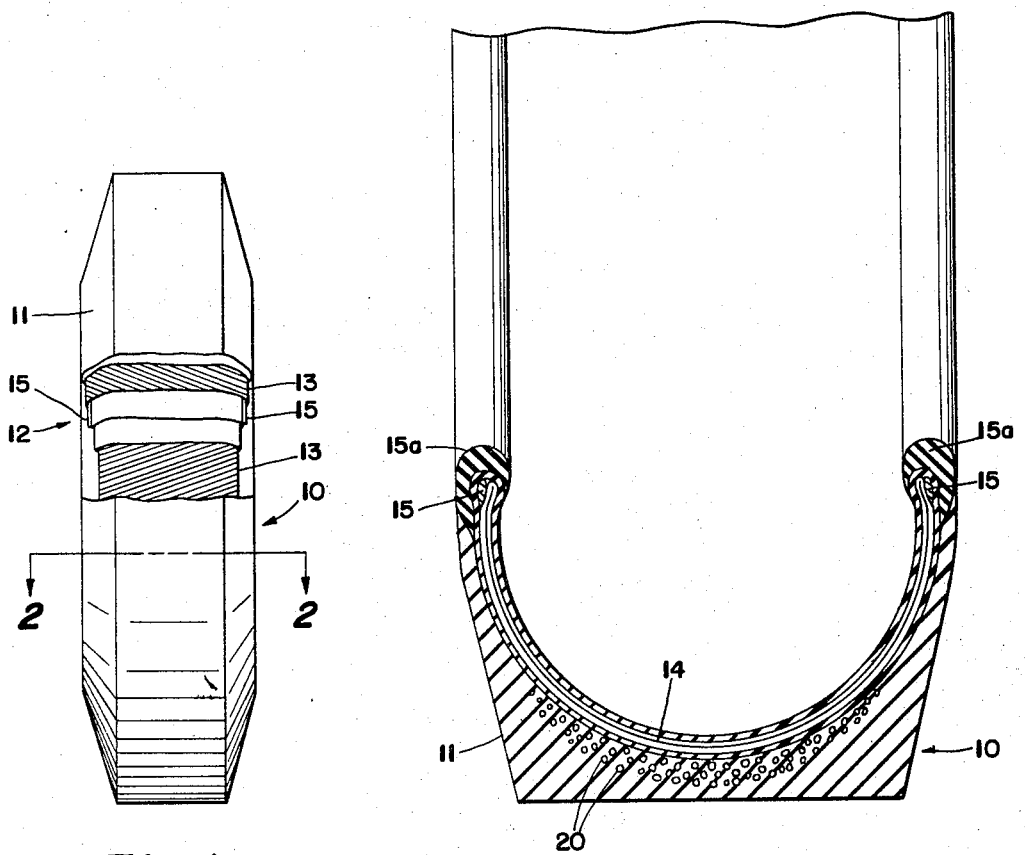
Fig. 1
Fig. 2
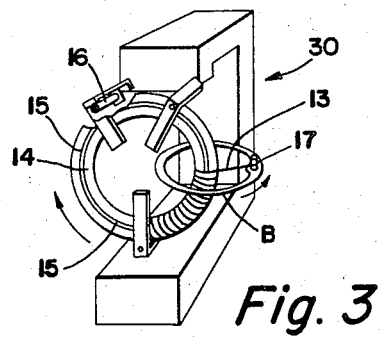
Fig. 3
INVENTOR.
ALEXANDER V. ALEXEFF
BY
ATTORNEYS March 26, 1968  A. V. ALEXEFF  3,375,150
TIRE MANUFACTURING METHODS Original Filed May 27, 1965  2 Sheets-Sheet 2

INVENTOR.
ALEXANDER V. ALEXEFF
BY

ATTORNEYS

United States Patent Office 3,375,150
Patented Mar. 26, 1968

3,375,150
TIRE MANUFACTURING METHODS
Alexander V. Alexeff, Cleveland, Ohio, assignor to Industrial Ovens, Incorporated, Cleveland, Ohio, a corporation of Ohio
Original application May 27, 1965, Ser. No. 459,305, now Patent No. 3,336,964, dated Aug. 22, 1967. Divided and this application Nov. 21, 1966, Ser. No. 605,118
3 Claims. (Cl. 156—117)

ABSTRACT OF THE DISCLOSURE

A method of making a reinforcing member for a radial-type pneumatic tire comprising winding a cord in a helical pattern around an annular form and then shaping the form into a U by moving a central circumferential zone of the form radially outwardly.

---

This application is a divisional application with respect to Ser. No. 459,305, filed May 27, 1965, now U.S. Patent No. 3,336,964.

This invention relates to tire manufacturing techniques and, more particularly, to radial type tire building operations.

Radial type tires have a U-shaped cross section, and include a tread, sidewalls, cord reinforcing plies, and bead rings. Conventional techniques for producing radial type tires include building the cord reinforcing plies on a cylindrical supporting base and lapping the edges of one or more of the plies over the bead rings. After the desired number of plies have been built up in this manner, an extruded tread strip, which has been spliced to form a cylinder, is applied over the built-up plies. The central circumferential zone of the cylinder so formed is then expanded radially outwardly to increase the diameter of the assembly in the tread area and to draw the bead rings toward each other. After the building operation, the tire is placed in a mold and vulcanized to produce a finished pneumatic tire.

The cord reinforcing plies comprise parallel cords such as rayon or nylon that are calendered with rubber to produce a relatively wide web. The web is cut on a bias so that the cords form a desired angle with respect to the circumference of the tire.

A large portion of the tire manufacturing cycle, therefore, includes laying up relatively expensive cord reinforcing plies to form the "green" tire.

According to the present invention, a radial type tire is formed by winding techniques that eliminate the use of expensive calendered cord reinforcing webs and which eliminate splicing operations which are normally required to join the plies to each other and to the bead rings.

A winding method for producing reinforcing members for tires is set forth in the patent to De Cloud No. 2,692,005. According to the De Cloud procedure, a reinforcing cord is helically wound about a cylindrical mandrel and after the winding operation, the helix is impregnated with liquid rubber. The cord helix is then removed from the mandrel, and a pair of bead wires are inserted longitudinally through the helix and the helix is then collapsed or flattened upon itself. The flat reinforcing member is then formed into the shape of the outer peripheral portion of a torus by splicing the ends of each bead wire by butt welding and then pushing the central portion of the cylindrical form radially outwardly.

The procedure set forth in the De Cloud patent, however, involves undesirable splicing operations. Moreover, the two layers of cord reaches that are formed when the helix is collapsed are not separated by any additional material for spacing the cords in order to reduce friction and heat during use.

It is an object of the present invention to overcome many of the disadvantages of prior art techniques for building a tire.

It is a more particular object of this invention to provide a method for building a radial type tire that eliminates the use of calendered reinforcing plies and operations for joining or seaming the plies to form a tire.

These and other objects and advantages of the invention will become apparent and more fully understood from the following detailed description of the invention, and from the accompanying drawings, in which:

FIG. 1 is a fragmentary view of a tire made according to the invention, with portions of the body of the tire being partially broken away.

FIG. 2 is an enlarged, fragmentary, sectional view, the plane of the section being indicated by the line 2—2 in FIG. 1.

FIG. 3 is a schematic, perspective view of a suitable winding apparatus that may be employed to carry out a step of the method according to this invention.

Figures 4, 5:
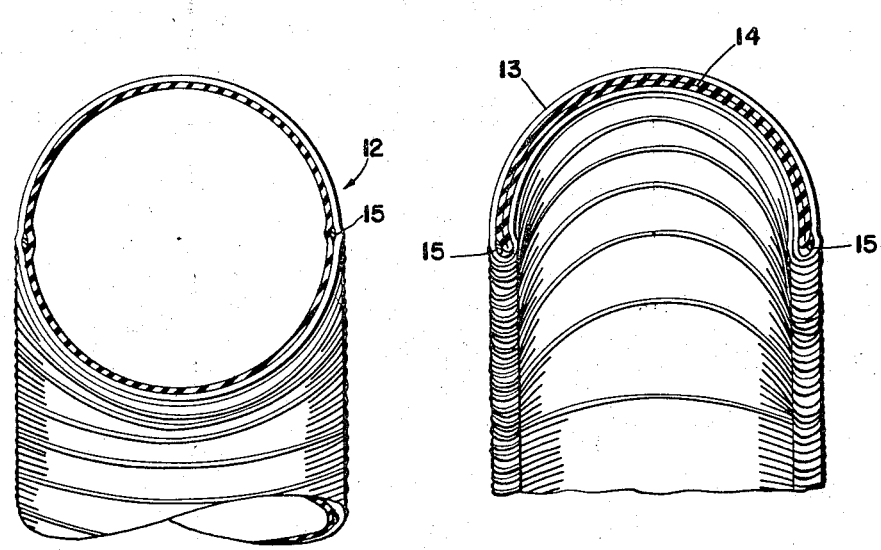
FIG. 4 is a fragmentary, cross sectional view of a portion of the tire reinforcement in one stage of its manufacture.
FIG. 5 is a fragmentary, cross sectional view of a portion of the reinforcement showing a further stage of the manufacturing operation.

Referring now to the drawings, and particularly to FIGS. 1 through 5, a radial type tire body 10 is illustrated. The body 10 includes a suitable elastomeric material 11, such as rubber, having a reinforcing member 12 embedded therein. The reinforcing member 12 comprises a cord 13 which is helically wound about an inner sheet portion 14, and about a pair of bead rings 15.

The inner sheet portion 14 may be a conventional inner tube which is initially inflated to the torus shape illustrated in FIG. 3. The portion 14 may be rendered temporarily rigid in accordance with the teachings set forth in my prior Patent No. 3,915,102. For example, the portion 14 may be filled with a fluid coolant, such as liquid carbon dioxide, which temporarily freezes the portion 14 in the shape of a torus. The coolant is introduced through a passageway (not shown) in the portion 14. While the portion 14 is frozen or otherwise stiffened, the bead rings 15 are applied to the sides of the portion 14 and the assembly is then wrapped with the cord 13 in the manner schematically illustrated in FIG. 3. The bead rings may be initially supported on the sidewalls of the portion 14 by a suitable cement, tape, or by cords.

The portion 14 is supported for rotation about its central axis by the rolls 16 of a winding machine 30, one of which may be powered to rotate the portion 14. A rubber-impregnated ribbon or cord 13, such as rubber-impregnated nylon or rayon, is helically wound on the portion 14. The cord or ribbon is unwound from a bobbin 17 which is mounted on a hoop 18. The hoop 18 is driven so that the bobbin 17 orbits the portion 14 in the manner indicated in FIG. 3. The rotational speed of the portion 14 and the orbiting speed of the bobbin 17 are correlated so that a desired helix angle is traced on the portion 14 by the cord 13.

After the cord 13 is wrapped on the portion 14, any fluid that may have been introduced into the portion 14 is exhausted.

After the winding operation, the reinforcement 12 is in the shape illustrated in FIG. 4, with the portions of the cord which comprise the outer periphery of the reinforcing member helically oriented with respect to the portions of the cord which comprise the inner periphery of the reinforcing member. The inner periphery of the reinforcing member 12 is then pushed radially outwardly until the U-shaped cross section illustrated in FIG. 5 is achieved. Of course, the inner and outer cord portions retain their helically oriented relationship. The reinforcing member 12 is then provided with a tread strip and conventional reinforced wear members 15a, and the assembly is then placed in a mold and vulcanized in a conventional manner to produce the finished radial type pneumatic tire illustrated in FIG. 1. If desired, circumferential reinforcing members 20, such as wire, nylon, or rayon reinforcing members, may be applied to either the outside periphery of the reinforcing member 12 or to the application of the tread strip or to the inner portion 14 prior to the winding operation.

Figures 6, 7:
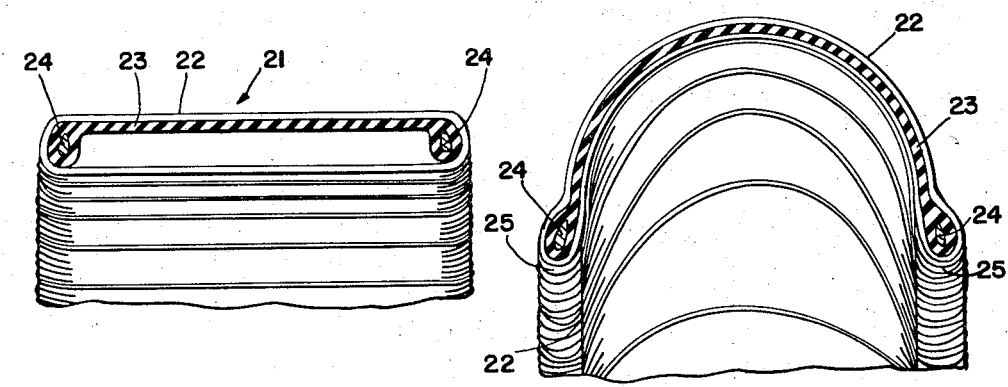
FIG. 6 is a fragmentary, cross sectional view of a portion of the reinforcement showing a stage of the manufacturing operation according to a further aspect of this invention.
FIG. 7 is a fragmentary, cross sectional view of the tire reinforcement illustrated in FIG. 6 but showing a later stage of the manufacturing operation.

Referring now to FIGS. 6 and 7, a reinforcing member 21 according to a further aspect of this invention is illustrated. The reinforcing member 21 comprises a rubber-impregnated cord 22 which is helically wound about an inner portion 23 and about a pair of bead rings 24.

The inner portion 23 may be a molded rubber cylinder having the bead rings 24 molded into the opposite ends of the cylinder. The portion 23 may be rendered temporarily rigid by freezing. The portion 23 may then be supported for rotation about its central axis by the roll 16 of the winding machine 30. If desired, the portion 23 need not be stiffened. The portion 23 may be mounted in the winding machine 30 in an unstiffened condition and additional rolls (not shown) may be provided to support the inner periphery of the portion 23 and maintain the spaced relationship of the bead rings 24. In this instance, the additional rolls may be mounted on the machine 30 so that they constitute pinch rolls with the roll 16. The additional rolls would be provided with means, such as grooves, to space the bead rings 24 and thereby maintain the portion 23 in a rigid condition. While the portion 23 is frozen or otherwise stiffened, it is helically wound or wrapped with the rubber-impregnated cord 22 in the manner previously described and schematically illustrated in FIG. 3 so that the cord portions which comprise the inner periphery of the reinforcing member are helically oriented with respect to the cord portions which comprise the outer periphery of the reinforcing member.

After the portion 23 has been wrapped with its helical windings, the central circumferential zone of the reinforcing member 21 is then pushed radially outwardly to increase the diameter of the assembly in the tread area and to draw the bead rings 24 toward each other until the U-shaped cross section illustrated in FIG. 7 is achieved. The U-shaped cross section is then provided with a conventional tread strip (not shown) and conventional reinforced wear members 25. The assembly is then placed in a mold and vulcanized in a conventional manner to produce a radial type tire.

If desired, circumferential reinforcing members (not shown) similar to the reinforcing members 20 may be provided on the reinforcing member 21 prior to the application of the tread strip.

The scope of the invention is not limited to the slavish imitation of all the structural and operative details mentioned above. These have been given merely by way of an example of a presently preferred embodiment of the invention.

What is claimed is:

1. A method of building an annular reinforcing member for a tire which is of substantially uniform structure completely around said member, comprising producing a closed loop annular form of substantially constant cross-section about a central axis; said form including axially spaced beads formed as closed loops of substantially equal size and a sheet portion extending between said beads, said beads being located at opposite axially spaced extremities of said sheet portion, thereafter winding a cord in a helical pattern around said annular form to produce a substantially continuous substantially uniform cord pattern completely around said form while maintaining said form sufficiently rigid to prevent substantial deformation thereof resulting from said winding, and thereafter moving a central circumferential zone of the form between said beads radially outward with respect to said axis to produce a U-shaped cross-section of cord enclosing said form with the cords inside said form substantially uniformly spaced from the cords outside said form by a distance equal to the thickness of the material of said form.

2. A method of building an annular reinforcing member for a tire as set forth in claim 1 wherein said sheet portion forms a hollow torus including an inner wall portion extending between said beads and an outer wall portion extending between said beads at a location spaced from said axis a greater distance than the spacing between said inner wall portion and said axis, and said inner wall portion is moved radially outward with respect to said axis until it extends substantially along said outer wall portion to produce said U-shaped cross-section.

3. A method of building an annular reinforcing member for a tire as set forth in claim 1 wherein said sheet portion during winding extends substantially straight between said beads and after winding is deformed to produce said U-shaped cross-section.

References Cited

UNITED STATES PATENTS

| 1,603,857 | 10/1926 | Midgley | 156—117 |
| 2,084,009 | 6/1937 | Sohl | 156—416 |
| 2,182,176 | 12/1939 | Maranville | 156—416 |
| 2,915,102 | 12/1959 | Alexeff et al. | 152—356 |
| 3,183,134 | 5/1965 | Frisby | 156—117 |

EARL M. BERGERT, *Primary Examiner.*

HAROLD ANSHER, *Examiner.*

UNITED STATES PATENT OFFICE
CERTIFICATE OF CORRECTION

Patent No. 3,375,150                           March 26, 1968

Alexander V. Alexeff

It is certified that error appears in the above identified patent and that said Letters Patent are hereby corrected as shown below:

Column 2, line 47, "3,915,102" should read -- 2,915,102 --.

Signed and sealed this 19th day of August 1969.

SEAL)
Attest:

Edward M. Fletcher, Jr.                       WILLIAM E. SCHUYLER, JR.
Attesting Officer                               Commissioner of Patents